No. 859,823. PATENTED JULY 9, 1907.
LA FAYETTE LILLARD.
PROCESS OF EXTRACTING BUTTER FROM CREAM.
APPLICATION FILED DEC. 5, 1906.

Witnesses:

Inventor,

UNITED STATES PATENT OFFICE.

LA FAYETTE LILLARD, OF BOOTJACK, CALIFORNIA.

PROCESS OF EXTRACTING BUTTER FROM CREAM.

No. 859,823.	Specification of Letters Patent.	Patented July 9, 1907.

Application filed December 5, 1906. Serial No. 346,461.

To all whom it may concern:

Be it known that I, LA FAYETTE LILLARD, a citizen of the United States, residing at Bootjack, in the county of Mariposa and State of California, have invented new and useful Improvements in Processes of Extracting Butter from Cream, of which the following is a specification.

This invention relates to the process of extracting butter from cream by means of passing atoms of air upward through the cream and has for its objects, first, to provide a time and labor-saving process of making butter of the highest quality; second, to provide a successful method of granulating cold cream; and third, to provide a way to gather the cold grains of butter with as little heat as possible.

I attain these objects by the mechanism illustrated in the accompanying drawing, in which—

Figure 1:
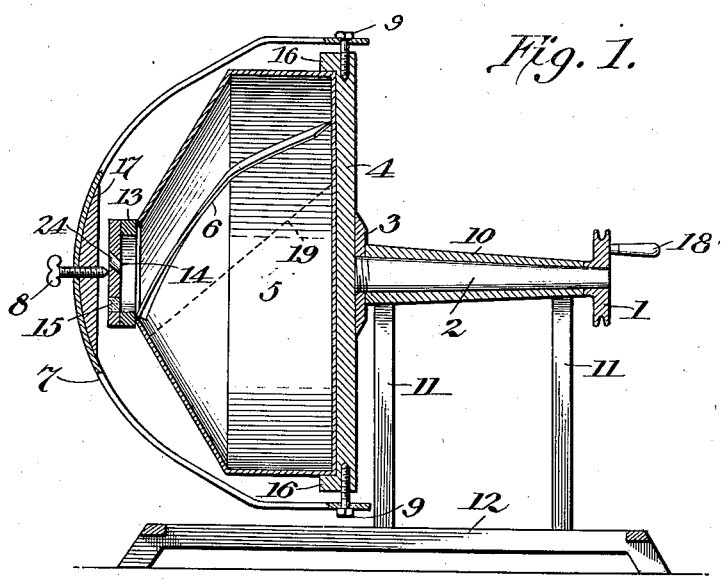
Figure 2:
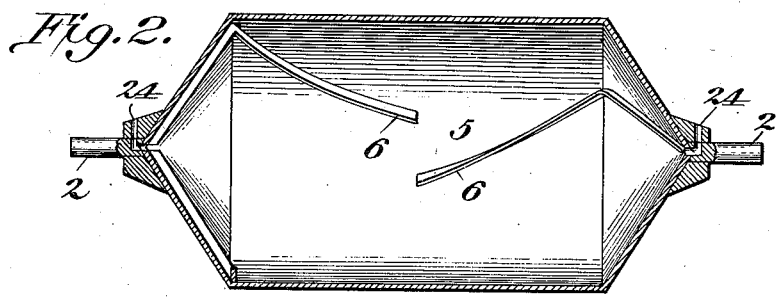
Figure 3:
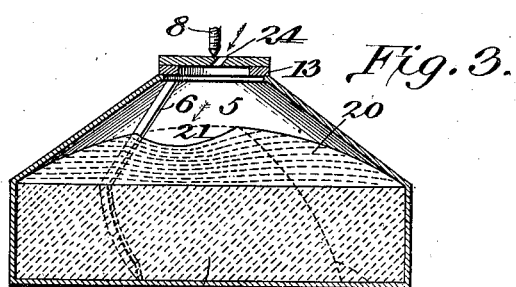

Figure 1 is a vertical section of a pneumatic butter separator suitable for extracting butter from cream of any temperature above 32° Fahrenheit. Fig. 2 is a vertical section of a pneumatic butter separator cylinder of large capacity. Fig. 3 is a horizontal section of a pneumatic butter separator bowl in action.

Similar figures refer to similar parts throughout the several views.

Crank pulley 1 is secured to tapering shaft 2 which is screwed into flange 3 which is bolted to plate 4.

5 is a cylindro-conical bowl or cylinder conical at both ends having two or more narrow rings 6 secured to inner concave surfaces. Spring bow 7; thumb screw 8 and screw bolts 9, 9, hold in position gasket 13, cover 14 and bowl 5. Bearing 10 standards 11, 11, and base 12 constitute the frame work of the separator.

20 is front edge of cream, 21 is a moving air passage automatically formed under the cream behind wing 6 said wing having its cone-end in contact with the air as shown. Dotted line 22 is the rear edge of said air-passage—the front edge being the submerged portion of wing 6.

23 is the cream.

24 is an air-passage in center of cover 14 or in either conical end of cylinder. The arrow indicates the direction of the air current.

The separator bowl may be revolved by turning crank 18 by hand or by passing a sewing machine belt around pulley 1. On account of the driving back action of wing 6, the surface of the cream is supported on an inclined plane as represented by the dotted line 19. Cream is driven back in front of wing 6 and the air is sucked or drawn back behind said wing. The cream drops to the surface of the bowl along dotted line 22. As the cylinder end of wing 6 moves from four to six times as fast as the cone end of said wing, the air is drawn to rear end of air-passage 21. When said air passage moves out from under the cream, the air current goes with it leaving no air under the cream to rise up through the cream in the form of air bubbles. As no air bubbles rise up through the cream, no froth can form while granulating cold cream. When the air current comes in contact with the cream above said air-current, atoms of air rise up into the cream breaking the grains of butter loose from the milk. If the granulated cream be too cold the temperature should be increased by placing a lighted lamp stove under the revolving bowl, at the same time the centrifugal force should be increased by elevating the mouth end of the separator about 45 degrees. The temperature of the cream may be increased to about 50° Fahrenheit during the process of granulation. The granulated cream will be its own thermometer. As soon as the temperature is correct, the butter will gather instantly.

I am aware that air processes are used in making butter, but they fill the cream with air-bubbles. Air bubbles drive the atoms of air to the surface and prevent said atoms from working their way up through the cream.

I claim

1. The pneumatic process of extracting butter from cream consisting in continuously driving the cream from the cone-ends of the wings for the purpose of keeping said cone-ends of the wings in contact with the air and continuously and simultaneously forming a moving air passage under the cream and drawing a current of air through the same, substantially as described.

2. The pneumatic process of extracting butter from cream consisting in continuously driving the cream from the cone-ends of the wings for the purpose of keeping said cone-ends of the wings in contact with the air and continuously drawing a current of air under and out from under the cream through an air-passage formed behind a wing having its cone-end in contact with the air, substantially as described.

3. The pneumatic process of extracting butter from cream consisting in continuously driving the cream from the cone-ends of the wings for the purpose of keeping said cone ends of the wings in contact with the air and continuously drawing a current of air under and out from under the cream until cream is well granulated, then simultaneously increasing the centrifugal force and the temperature of the granulated cream, substantially as described.

4. The pneumatic process of extracting butter from cream consisting in continuously driving the cream from the cone-ends of the wings for the purpose of keeping said cone ends of the wings in contact with the air and continuously drawing a current of air under and out from under the cream and simultaneously increasing the temperature of the cream to about 50° Fahrenheit during the process of granulation, then simultaneously increasing the centrifugal force and the temperature of the granulated cream, substantially as described.

LA FAYETTE LILLARD.

Witnesses:
M. B. JARVIS,
JOHN A. L. DUNCAN.